US012624974B2

(12) United States Patent
Larsson et al.

(10) Patent No.: US 12,624,974 B2
(45) Date of Patent: May 12, 2026

(54) PROTECTIVE HOOD FOR A FIELD DEVICE, AND MEASUREMENT/AUTOMATION FIELD DEVICE

(71) Applicant: Endress+Hauser Flowtec AG, Reinach (CH)

(72) Inventors: Björn Larsson, Birsfelden (CH); Philipp Loeffel, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 268 days.

(21) Appl. No.: 18/554,838

(22) PCT Filed: Mar. 21, 2022

(86) PCT No.: PCT/EP2022/057318
§ 371 (c)(1),
(2) Date: Oct. 11, 2023

(87) PCT Pub. No.: WO2022/218647
PCT Pub. Date: Oct. 20, 2022

(65) Prior Publication Data
US 2024/0192035 A1 Jun. 13, 2024

(30) Foreign Application Priority Data
Apr. 14, 2021 (DE) ..................... 10 2021 109 404.6

(51) Int. Cl.
G01D 11/24 (2006.01)
(52) U.S. Cl.
CPC .................................. G01D 11/245 (2013.01)

(58) Field of Classification Search
CPC .................................................... G01D 11/245
See application file for complete search history.

(56) References Cited

U.S. PATENT DOCUMENTS

| | | | |
|---|---|---|---|
| 10,077,149 B2 | 9/2018 | Burger | |
| 2014/0165727 A1* | 6/2014 | Mueller | ................. G01D 11/30 |
| | | | 73/514.39 |
| 2016/0268737 A1* | 9/2016 | Gutmann | ............. G01D 11/245 |

FOREIGN PATENT DOCUMENTS

| | | |
|---|---|---|
| DE | 3216229 A1 | 6/1983 |
| DE | 3727585 A1 | 3/1988 |
| DE | 4403660 A1 | 10/1994 |

(Continued)

*Primary Examiner* — Jamel E Williams
(74) *Attorney, Agent, or Firm* — Kelly J. Smith; Endress+Hauser (USA) Holding, Inc.

(57) ABSTRACT

A protective hood has a longitudinal axis and a hood wall, which has an open first end and a closed second end and forms a hood chamber. The hood chamber is designed to receive an electronics housing of a field device along the longitudinal axis via the open first end. The protective hood has at least one fastening apparatus, which is designed to be brought into mechanical contact with the electronics housing. Without an application of force, the protective hood has a first shape in which the fastening apparatus is at a first distance from the longitudinal axis, characterized in that the protective hood can be elastically deformed, by an application of force, into a second shape in which the fastening apparatus is at a second distance from the longitudinal axis, the second distance being greater than the first distance.

10 Claims, 2 Drawing Sheets

(56)         References Cited

FOREIGN PATENT DOCUMENTS

| DE | 4400993 | A1 | | 7/1995 | | |
|----|---------|----|----|--------|----|----|
| DE | 19514026 | A1 | | 10/1996 | | |
| DE | 102010061750 | A1 | * | 5/2012 | ............. | H05K 5/064 |
| DE | 102011004447 | A1 | * | 8/2012 | ........... | G01D 11/245 |
| EP | 2105715 | A1 | * | 9/2009 | ......... | G01M 3/2807 |
| EP | 2105716 | A1 | * | 9/2009 | ............. | G01F 23/00 |
| EP | 2105716 | B1 | | 12/2016 | | |
| JP | 5008219 | B2 | * | 8/2012 | ............. | G01V 1/053 |

\* cited by examiner

PROTECTIVE HOOD FOR A FIELD DEVICE, AND MEASUREMENT/AUTOMATION FIELD DEVICE

CROSS-REFERENCE TO RELATED APPLICATIONS

The present application is related to and claims the priority benefit of DPMA Patent Application No. 10 2021 109 404.6, filed on Apr. 14, 2021, and International Patent Application No. PCT/EP2022/057318, filed Mar. 21, 2022, the entire contents of which are incorporated herein by reference.

TECHNICAL FIELD

The invention relates to a protective hood for a field device and to a measurement/automation field device.

BACKGROUND

Measurement/automation field devices are frequently used in environments with adverse conditions, so that protective hoods are used which are designed to protect the field devices from damage. An example of such a protective hood can be found in EP2105715B1, in which the protective hood can be fastened to a field device by means of a folding and latching mechanism, the protective hood having two hinged protective hood parts. However, such a protective hood is not particularly mechanically stable, and latching lugs with ambient contact are, in turn, susceptible to damage. It is also known to screw protective hoods to field device housings, but this requires the use of tools, which is to be avoided.

SUMMARY

The object of the invention can be considered to provide a robust protective hood and a field device having such a protective hood which can be mounted and removed in a simple manner.

The object is achieved by a protective hood of the invention and by a field device of the invention according to the present disclosure.

A protective hood according to the invention designed for a measurement/automation field device has a longitudinal axis and a hood wall, which forms a hood chamber having an open first end and a closed second end, wherein the hood chamber is designed to receive an electronics housing of the field device along the longitudinal axis via the open first end, wherein the protective hood has at least one fastening apparatus, which is designed, in particular, to be brought into mechanical contact with the electronics housing, wherein the protective hood can be elastically deformed, wherein, without an application of force, the protective hood has a first shape in which the fastening apparatus is at a first distance from the longitudinal axis, wherein the protective hood can be elastically deformed, by an application of force, into a second shape in which the fastening apparatus is at a second distance from the longitudinal axis, the second distance being greater than the first distance.

In one embodiment, a hood cross section in the first shape follows a circle, wherein the hood cross section in the second shape follows an oval.

In one embodiment, wherein the protective hood has at least one spacing apparatus in the region of the second end, which spacing apparatus is designed to ensure a minimum distance between the second end and the electronics housing.

In one embodiment, the fastening apparatus has a projection in each case, wherein the fastening apparatus is formed in particular integrally in the hood wall.

In one embodiment, the protective hood is made of a plastic or a metal.

In one embodiment, a force of at most 100 newtons, and in particular at most 50 newtons, must be applied to bring the protective hood into the second shape.

In this way, the protective hood can be removed and/or mounted solely by manual operation without tools.

In one embodiment, the second distance is at least 5% greater than the first distance, and preferably at least 10% greater than the first distance, or wherein the second distance is at least 1 millimeter and preferably at least 2 millimeters greater than the first distance.

In one embodiment, the projection has a first surface, wherein a normal vector of the first surface faces the second end, wherein an interior angle between the normal vector and a cross section of the protective hood is greater than 45 degrees and, in particular, greater than 55 degrees, and preferably greater than 60 degrees.

In this way, it is prevented that the protective hood can be removed by pulling along a longitudinal axis of the protective hood.

In one embodiment, the interior angle is less than 85 degrees and, in particular, less than 80 degrees, and preferably less than 75 degrees.

In this way, when the protective hood is mounted, the projection applies a force in the direction of the first open end, as a result of which the protective hood is firmly arranged on the electronics housing.

In one embodiment, the projection has a second surface, wherein a normal vector of the second surface faces the first end, wherein an interior angle between the normal vector and the hood cross section of the protective hood is less than 45 degrees and, in particular, less than 35 degrees.

In this way, the protective hood can be mounted easily by attaching it onto an associated electronics housing.

A measurement/automation technology field device according to the invention comprises: an electronics housing having a housing wall forming a housing chamber;

a measuring sensor designed to generate a measurement signal of a measurement variable;

an electronic measuring/operating circuit for providing measured values of the measured variable by means of the measurement signal, wherein the electronic measuring/operating circuit is arranged in the housing chamber, wherein the field device has a protective hood according to any one of the preceding claims, wherein the electronics housing is arranged in the hood chamber and carries the protective hood.

The housing can comprise one or more housing covers which close openings to the housing chamber. The at least one housing cover thus forms part of the housing wall.

In one embodiment, the hood wall in the first shape has a distance of at most 30 millimeters and/or at least 5 millimeters from the housing at least outside of a region of the at least one first fastening apparatus and the spacing apparatus.

In one embodiment, the at least one first fastening apparatus with the hood wall in the first shape rests on the housing wall, in particular a tip, edge or on a surface of the housing wall, and applies a force to the protective hood with a force component in the direction of the open first end.

BRIEF DESCRIPTION OF THE DRAWINGS

The present disclosure will now be described with reference to exemplary embodiments.

DETAILED DESCRIPTION

Figure 1:
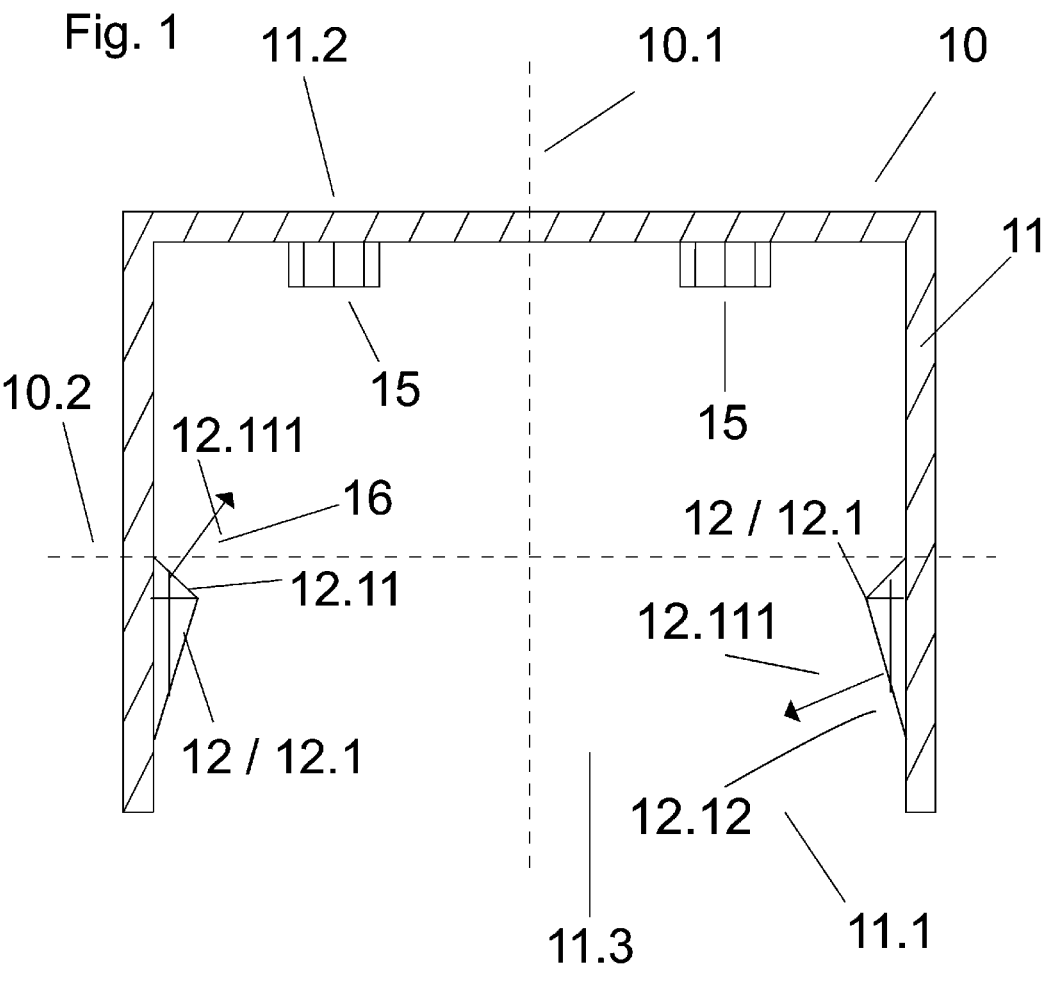
FIG. 1 shows a longitudinal section through an exemplary protective hood according to the present disclosure.

FIG. 1 shows a longitudinal section through an exemplary protective hood 10 according to the invention for a measurement/automation field device 1, wherein the protective hood has a longitudinal axis 10.1 and a hood wall 11. The hood wall has a first open end 11.1 and a second closed end 11.2 and forms a hood chamber 11.3. The protective hood is designed to receive an electronics housing 20 of the field device along the longitudinal axis via the open first end (see FIG. 3). The protective hood has at least one fastening apparatus 12, here for example two, by means of which the protective hood can be fastened to the electronics housing. As shown here, the protective hood can also have a spacing apparatus 15 which is designed to ensure a minimum distance between a received electronics housing and the hood wall in the region of the second end.

As shown here, the fastening apparatus can comprise a projection 12.1 with one of the first surface 12.11, in which a normal vector 12.111 of the first surface faces the second end. An interior angle 16 between the normal vector and a hood cross section 10.2 of the protective hood is greater than 45 degrees and, in particular, greater than 55 degrees, and preferably greater than 60 degrees. This makes it difficult or impossible to remove the protective hood by applying force along the longitudinal axis. In one embodiment, the interior angle is less than 85 degrees and, in particular, less than 80 degrees, and preferably less than 75 degrees. In this way, the protective hood attached to an electronics housing brings about a pretension relative to the second end of the hood wall, so that it sits firmly and securely.

As shown here, the projection can comprise a second surface 12.12, wherein a normal vector 12.111 of the second surface faces the first end 11.1, wherein an interior angle 16 between the normal vector and the hood cross section 10.2 of the protective hood is less than 45 degrees and, in particular, less than 35 degrees. In this way, the protective hood can be mounted easily by attaching it onto an associated electronics housing.

The fastening apparatus can be formed integrally with the hood wall, wherein the hood wall can be produced, for example, by injection molding or forming under pressure.

The hood wall can be made of a plastic or a metal.

Figure 2:
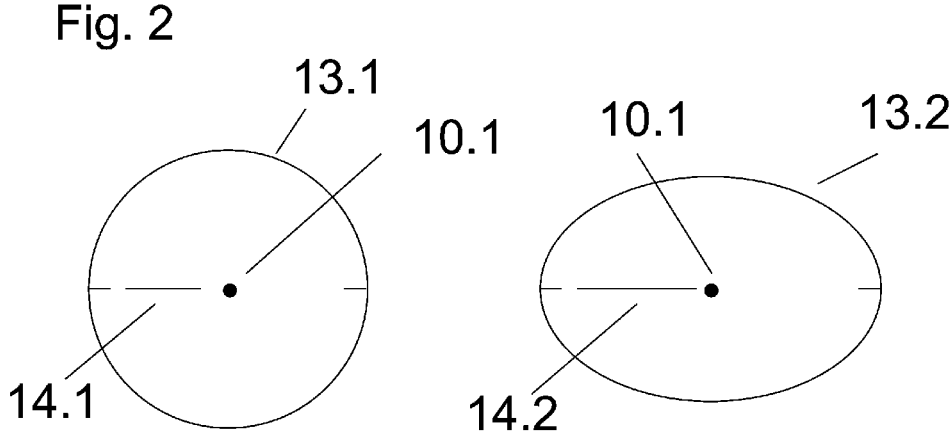
FIG. 2 outlines two different shapes of a cross section through the protective hood.

FIG. 2 outlines a major aspect of the invention. According to the invention, the protective hood can be elastically deformed, wherein, without an application of force, the protective hood has a first shape 13.1 in which the fastening apparatus is at a first distance 14.1 from the longitudinal axis, wherein the protective hood can be elastically deformed, by an application of force, into a second shape 13.2 in which the fastening apparatus is at a second distance 14.2 from the longitudinal axis, the second distance being greater than the first distance. As shown in FIG. 2, the hood cross section 10.2 can follow a circle in the first shape 13.1 and can follow an oval in the second shape 13.2.

In this way, by elastic deformation of the protective hood into the second shape, the protective hood can be put over an electronics housing and, when returning to the first shape, can engage the electronics housing by means of the fastening apparatus on the housing.

In one embodiment, the second distance is at least 5% greater than the first distance, and preferably at least 10% greater than the first distance, or wherein the second distance is at least 1 millimeter and preferably at least 2 millimeters greater than the first distance.

In order to be able to attach the protective hood to an electronics housing purely manually without using tools, the protective hood can be designed such that a force of at most 100 newtons, and in particular at most 50 newtons, is required for bringing the protective hood into the second shape 13.2. The person skilled in the art can use simulation programs or relevant formulas or engineering mechanics know-how to accomplish this.

Figure 3:
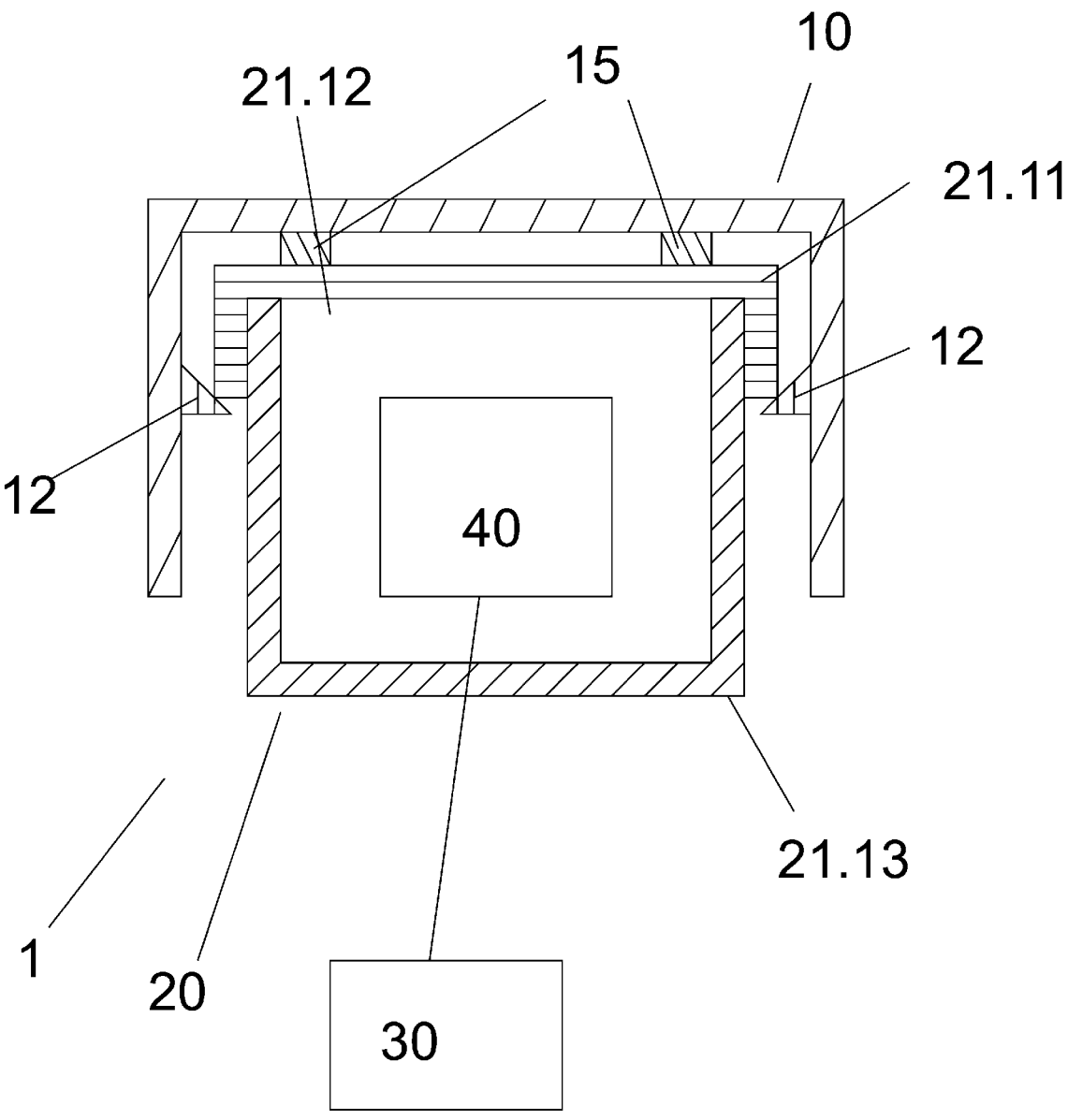
FIG. 3 outlines a schematic exemplary field device according to the present disclosure.

FIG. 3 outlines a longitudinal section through an exemplary measurement/automation field device 1 according to the invention having an electronics housing 20, a measuring sensor 30 designed to generate a measurement signal of a measured variable and an electronic measuring/operating circuit 40 arranged in the electronics housing for providing measured values of the measured variable by means of the measurement signal and a protective hood 10 according to the invention, which is carried by the electronics housing. The exemplary electronics housing shown here has a housing wall 21 which has a housing pot 21.13 with a housing opening 21.12 which is closed by a housing cover 21.11. As shown here, the protective hood can engage with an edge of the electronics housing, here an edge of the housing cover, to thus attach to the electronics housing. Alternatively, the housing pot can also provide engagement points for the protective hood.

The hood wall 11 in the first shape 13.1 can have a distance of at most 30 millimeters and/or at least 2 and, in particular, at least 5 millimeters from the electronics housing 20 at least outside of a region of the at least one first fastening apparatus 12 and the spacing apparatus 15. In this way, there is sufficient space for removing the protective hood in the second shape and good protection against adverse conditions.

The invention claimed is:

1. A protective hood designed for a measurement/automation field device,
    wherein the protective hood has a longitudinal axis and a hood wall, which has an open first end and a closed second end and forms a hood chamber,
    wherein the hood chamber is designed to receive an electronics housing of the field device along the longitudinal axis via the open first end,
    wherein the protective hood has at least one fastening apparatus, which is designed to be brought into mechanical contact with the electronics housing,
    wherein the protective hood, without an application of force, has a first shape in which the fastening apparatus is at a first distance from the longitudinal axis,
    characterized in that
    the protective hood can be elastically deformed, by an application of force, into a second shape in which the fastening apparatus is at a second distance from the longitudinal axis, the second distance being greater than the first distance, wherein the fastening apparatus has a projection in each case, wherein the fastening apparatus is formed integrally in the hood wall, wherein the projection has a first surface, wherein a normal vector of the first surface faces the second end, wherein an interior angle between the normal vector and the hood cross section of the protective hood is greater than 45 degrees, wherein the interior angle is less than 85 degrees, wherein the projection has a second surface, wherein a normal vector of the second surface faces the first end, wherein an interior angle between the normal vector and the hood cross section of the protective hood is less than 45 degrees.

2. The protective hood according to claim 1, wherein a hood cross section in the first shape follows a circle, wherein the hood cross section in the second shape follows an oval.

3. The protective hood according to claim 1, wherein the protective hood has at least one spacing apparatus in the region of the second end, which spacing apparatus is designed to ensure a minimum distance between the second end and the electronics housing.

4. The protective hood according to claim 1, wherein the protective hood is made of a plastic or a metal.

5. The protective hood according to claim 1, wherein a force of at most 100 newtons must be applied to bring the protective hood into the second shape.

6. The protective hood according to claim 1, wherein the second distance is at least 5% greater than the first distance, or wherein the second distance is at least 1 millimeter greater than the first distance.

7. A field device of measurement/automation technology, comprising:

an electronics housing having a housing wall forming a housing chamber;

a measuring sensor designed to generate a measurement signal of a measurement variable;

an electronic measuring/operating circuit for providing measured values of the measured variable based on the measurement signal, wherein the electronic measuring/operating circuit is arranged in the housing chamber, characterized in that the field device has a protective hood according to any one of claim 1, wherein the electronics housing is arranged in the hood chamber and carries the protective hood.

8. The field device according to claim 7, wherein the hood wall in the first shape has a distance of at most 30 millimeters and/or at least 5 millimeters from the electronics housing at least outside of a region of the at least one first fastening apparatus and the spacing apparatus.

9. The field device according to claim 7, wherein the at least one first fastening apparatus with the hood wall in the first shape rests on the housing wall and applies a force to the protective hood with a force component in the direction of the open first end.

10. The field device according to claim 7, wherein the protective hood can be mounted on the field device by applying a force along the longitudinal axis of the protective hood, and wherein the protective hood can be removed by deformation into the second shape and pulling off.

\* \* \* \* \*